United States Patent Office 3,423,408
Patented Jan. 21, 1969

3,423,408
PERHYDRO-1,2,4-THIADIAZINEDIOXIDES-(1,1) AND THEIR PREPARATION
Rolf Wilhelm Pfirrmann, Lucerne, Switzerland, assignor to Ed. Geistlich Sohne AG fur Chemische Industrie, Lucerne, Switzerland, a Swiss body corporate
No Drawing. Filed Oct. 4, 1965, Ser. No. 492,930
Claims priority, application Great Britain, Oct. 6, 1964, 40,734/64
U.S. Cl. 260—243
Int. Cl. C07d 93/22, 93/32
17 Claims

ABSTRACT OF THE DISCLOSURE

There are provided novel perhydro-1,2,4-thiadiazinedioxides of the formula

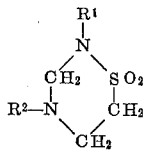

(where $R^1$ and $R^2$ which may be the same or different are hydrogen atoms, alkyl groups having 1–8 carbon atoms, cycloalkyl group, aralkyl groups, aryl groups or heterocyclic groups or together with the perhydrothiadiazinedioxide ring to which they are attached form a ring of perhydrothiadiazinedioxide nuclei separated by methylene groups joining nitrogen atoms of adjacent nuclei) and their physiologically acceptable acid addition salts. The new compounds are prepared by reacting a taurineamide of the formula

with formaldehyde or a substance liberating formaldehyde, and they show strong bactericidal activity against both gram negative and gram positive bacteria and against fungi.

---

This invention relates to novel compounds having bactericidal and fungicidal activity and to a process for their preparation.

According to the present invention, there are provided perhydro-1,2,4-thiadiazinedioxides-(1,1) of the general formula

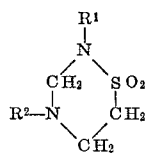   I (where $R^1$ and $R^2$ which may be the same or different are hydrogen atoms, alkyl groups having 1–8 carbon atoms, cycloalkyl groups, aralkyl groups, aryl groups or heterocycylic groups or together with the perhydrothiadiazinedioxide ring to which they are attached form a ring of perhydrothiadiazinedioxide nuclei separated by methylene groups joining nitrogen atoms of adjacent nuclei) and their physiologically acceptable acid addition salts.

The new compounds show strong bactericidal activity against both gram negative and gram positive bacteria and against fungi.

They are also active against many strains resistant to antibiotics such as penicillin. The toxicity of the compounds is very low and, for example, the product of Example 4 hereinafter has an $LD_{50}$ per os in white mice of 2000–2500 mg./kg. as well as excellent activity against *Staph. aur haem.* 1, *Strept. pyog. haem.* 6293, *Entrococcen* 3, *S. paratyphi-B* 5, *S. typhi* 6, *B. proteus vulg.* 8, *Pseudomonas aeruginosa* 7, *Shig. sonnel* 12 b, *E. coli* 5494 and *B. mesenterious*, as well as *Candida albicans, Aspergillus niger, Trichophyton gypseum* and *Epidermoph. interdigitale*.

The substituents $R^1$ and $R^2$ may carry substituents, for example, halogen atoms or hydroxy, amino, acylamido, carboxy, esterified carboxy, alkoxy or nitro groups and, in particular, one or both of $R^1$ and $R^2$ may be a methylene group linked to the nitrogen atom in the 2- or 4-position of a perhydro-1,2,4-thiadiazinedioxide-(1,1) ring carrying a substituent $R^1$ at the remaining nitrogen atom, where $R^1$ has the above meaning including hydrogen.

It will thus be seen that the invention includes such compounds as

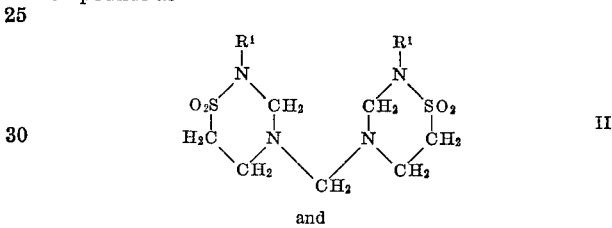   II and

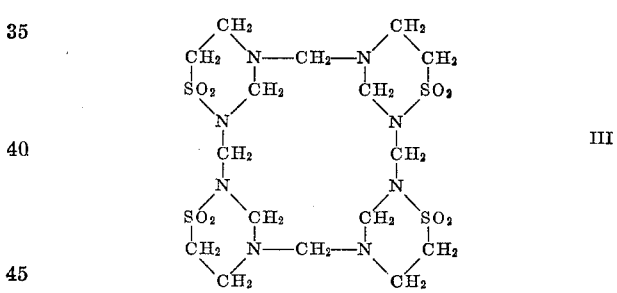   III where $R^1$ has the above meaning.

In general, compounds of general Formula II are preferred for their useful physiological activity and low toxicity.

The acid addition salts according to the invention include, for example, the hydrohalides, sulphates, phosphates, nitrates, acetates, citrates, tartrates, maleates or succinates. Those substances in which $R^1$ is hydrogen tend to form betaines which do not themselves form stable acid addition salts.

The substituents $R^1$ and $R^2$ can thus, besides the above heterocyclic groups, also, for example, be methyl, ethyl, chloroethyl, hydroxyethyl, aminoethyl, carbethoxymethyl, propyl, isopropyl, butyl, isobutyl, 1-methylpropyl, tertiary butyl, hexyl, cyclohexyl, methylcyclohexyl, benzyl, phenyl, chlorophenyl, methoxyphenyl, chloronitrophenyl or dimethylnitrophenyl groups.

Particularly preferred compounds having regard to their bactericidal activity are that of Formula II in which $R^1$ is hydrogen or those of Formula I in which $R^1$ and $R^2$ are both cyclohexyl, both n-butyl, or are a phenyl group and n-butyl group respectively. It is preferred that at least one of the groups $R^1$ and $R^2$ is hydrogen or an alkyl, cycloalkyl, aryl or heterocyclic group.

According to a further feature of the present invention there are provided pharmaceutical compositions comprising one or more compounds of Formula I in which $R^1$ and $R^2$ have the above meanings together with one or more pharmaceutical carriers or excipients.

Thus, for example, the compositions may take the form of tablets, dragees, capsules, lozenges, suppositories, ampoules for injection, syrups, linctuses, ointments, lotions, pastes, solutions, aerosol sprays etc.

The carriers or excipients in such compositions may, for example, be those conventional for such forms and may include starch, lactose, magnesium stearate, talc, gelatin, sterile water, suspending, emulsifying, dispersing, thickening or flavouring agents, ointment bases or aerosol propellants.

Dosage units forms such as tablets, capsules, suppositories or ampoules are preferred and advantageously each unit contains 10 to 1000 mg. of active substances, preferably 100 to 200 mg.

In the case of the product of Formula II in which $R^1$ is hydrogen, a particularly active substance, topical formulations are preferred, for example, powders, ointments, spray, solutions etc.

The compositions, and particularly the non-dosage forms such as syrups, ointments etc. preferably contain the active substance at a concentration between 0.10 and 20.0% by weight, preferably between 0.5 and 2.0% for aqueous solutions or aerosol sprays or up to 10% for powders and ointments.

The new compounds according to the invention may be prepared in any convenient way. According to a still further feature of the invention we provide a process for the production of compounds of general Formula I in which $R^1$ and $R^2$ have the above meanings in which a taurineamide of the general formula $$R^2-NH-CH_2-CH_2-SO_2-NH-R^1 \qquad IV$$

or an acid addition salt thereof is subjected to ring closure for example by reaction with formaldehyde or a substance liberating formaldehyde.

The reaction is preferably effected in an inert solvent medium, for example water or an organic solvent such as a substituted amide, e.g., dimethylformamide or dimethylacetamide, an ester, e.g., tetrahydrofuran, dioxan or diethyl ether, a hydrocarbon or nitro-hydrocarbon, e.g., benzene or nitrobenzene, an alkanol, e.g., methanol or ethanol or a halogenated hydrocarbon e.g., chloroform or dichloroethane. The formaldehyde is preferably reacted in aqueous solution but a formaldehyde releasing compound such as paraformaldehyde, for example in solution in an organic solvent, if desired in admixture with water, may also be used.

The reaction conditions will vary with the nature of the reactants, for example, whether $R^1$ and $R^2$ are aliphatic or aromatic, but the reaction temperature will in general be between 20° and 120° C. The pH of the reaction mixture is advantageously weakly alkaline, e.g., pH 8.0 and may if desired be adjusted, e.g., with bicarbonate.

The ratio of formaldehyde to the taurineamide starting compound is preferably 1:1 or greater, Where one of the substituents $R^1$ and $R^2$ is hydrogen, however, reaction at the cyclic NH groups is possible to form methylene bridges linking two thiadiazine dioxide rings as in compounds of Formula II while when both $R^1$ and $R^2$ are hydrogen, compounds of Formula III may be formed. Where compounds of Formula II are required, the ratio of formaldehyde to taurineamide is preferably at least 3:2 and when compounds of Formula III are required the ratio is preferably at least 2:1.

The reaction time is preferably in the range of 20 to 200 minutes, preferably about 80 minutes.

It is also possible to convert compounds of Formula II into mono-nuclear compounds of Formula I by catalytic hydrogenation, for example using a platinum oxide catalyst at normal pressures of hydrogen.

The taurineamides used as starting material in the process of the invention may be prepared by reacting ammonia or primary amines with vinyl sulphonamides of the general formula $CH_2=CH-SO_2-NH-R^1$ where $R^1$ has the meaning given above. The taurineamide may also be prepared by reacting taurine with phthalic anhydride to give the phthalimido derivative which may then be converted into an amide via the acid halide followed by removal of the phthalyl group in the usual way.

In order that the invention may be well understood, the following examples are given by way of illustration only:

Example 1

4-n-butyl-2-phenyl-perhydro-1,2,4-thiadiazinedioxide (1,1), $C_{13}H_{20}O_2N_2S/268.13$. M.P.: 58–63° C.

*Analysis.*—Calculated: C, 58.19%; H, 7.51%; N, 10.44%. Found: C, 58.48%; H, 7.28%; N, 10.37%.

15.0 g. of n-butyl-β-amino-ethyl-sulphonyl-aniline were dissolved in 100 ml. of 96% alcohol and boiled with 20 ml. of 40% formaldehyde under reflux; water was then added to complete cloudiness. The reaction mixture was evaporated in vacuo to dryness, the residue taken up with ether, washed with water and the ethereal solution dried and distilled off.

15 g. of oil were obtained as a residue which crystallised from petroleum ether on standing. Recrystallised from 400 ml. of hexane: 8.0 g. of desired product as pure white crystals of M.P. 57–63° C.

Recrystallised from hexane for analysis. The n-butyl-amino-ethyl-sulphonyl-aniline used as starting material may be prepared from vinyl-sulphonyl-aniline by addition of n-butylamine.

Example 2

2,4-dicyclohexyl-perhydro - 1,2,4 - thiadiazine-dioxide-(1,1), $C_{15}H_{28}O_2N_2S/300.39$. M.P.: 100–102° C.

*Analysis.*—Calculated: C, 59.97%; H, 9.40%; N, 9.33%. Found: C, 59.80%; H, 9.32%; N, 9.37%.

1.1 g. of the compound

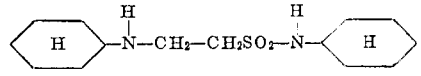

were dissolved in 30 ml. of $H_2O$ and 40 ml. of 95% alcohol; 5 ml. of 40% formaldehyde were added, the pH was adjusted with (a little) $NaHCO_3$ to 8 and the solution was boiled for half an hour under reflux. The slightly cloudy solution was colled and the precipitate filtered with suction. 800 mg. of the desired product as white crystals of M.P. 99–101° C. were obtained.

Recrystallised from alcohol for analysis.

Example 3

2,4-di-n-butyl - perhydro - 1,2,4 - triadiazinedioxide-(1,1); $C_{11}H_{24}O_2N_2S/248.32$; collected at 140°/0.1 mm.

*Analysis.*—Calculated: C, 53.20%; H, 9.47%; N, 11.28%. Found: C, 53.20%; H, 9.70%; N, 11.34%.

8.0 g. of n-butyl-β-amino-ethyl-sulphonyl butylamine were boiled for 30 minutes under reflux with 10 g. of 40% formaldehyde in 50 ml. of water and 0.5 g. of $NaHCO_3$. The solution was then etherified at pH 7 and the ether washed with water, dried and distilled off.

7.7 g. of the desired product as a yellow clear oil were obtained as residue which boiled at high vacuum (140° C./0.1 mm.). Distilled at high vacuum: 1.6 g. of a slightly yellow oil (residue of starting material); B.P. 134° C./0.4 mm.; collected for analysis.

Example 4

$$\begin{array}{c} \phantom{SO_2}\overset{H}{N}\phantom{CH_2}\overset{H}{N}\phantom{SO_2} \\ SO_2\diagup\phantom{i}\diagdown CH_2\quad CH_2\diagup\phantom{i}\diagdown SO_2 \\ |\phantom{SSS}|\phantom{SSSS}|\phantom{SSSS}| \\ CH_2\quad N{-}CH_2{-}N\quad CH_2 \\ \diagdown\phantom{i}\diagup\phantom{SSSSS}\diagdown\phantom{i}\diagup \\ CH_2\phantom{SSSSSSS}CH_2 \end{array}$$

$C_7H_{16}N_4O_4S_2$: Mol.: 284.369; M.P.: 154–158° C.

*Analysis.*—Calculated: C, 29.55%; H, 5.67%; N, 19.70%. Found: C, 29.99%; H, 6.31%; N, 19.92%.

3.2 g. of taurinamide hydrochloride were dissolved in 20 ml. of water and 2 g. of NaHCO₃ added. 2 g. of 38% formaldehyde was added dropwise and the reaction mixture then allowed to stand.

The precipitate was filtered with suction and the reaction product crystallised slowly. Yield: 1.9 g. of the desired product as white crystals of M.P. 154–158° C.

Example 5

(structure of $C_{16}H_{32}N_8S_4O_8$)

$C_{16}H_{32}N_8S_4O_8$: molecular weight: 592.76; M.P.: 210–215° C.

*Analysis.*—Calculated: C, 32.43%; H, 5.44%; N, 18.91%. Found: C, 32.42%; H, 5.89%; N, 18.31%.

8 g. of taurinamide hydrochloride were dissolved in 50 ml. of water and 7.5 g. of NaHCO₃ added. 8.75 g. of 40% formaldehyde were added slowly and dropwise to the reaction mixture which was allowed to stand for 48 hours. The crystalline precipitate was filtered with suction; 8.7 g. were obtained which were boiled with 700 ml. of acetone. The insoluble components were filtered off and recrystallised from a little water.

A substance according to Example 4 of M.P. 154–158° C. was found in the acetone mother liquor.

Example 6

(structure with $C_3H_7$ groups)

$C_{13}H_{28}N_4O_4S_2$: molecular weight: 368.531; M.P.: 112–115° C.

*Analysis.*—Calculated: C, 42.37%; H, 7.66%; N, 15.25%. Found: C, 42.59; H, 8.39%; N, 15.39%.

5 g. of the compound $$HCl \cdot NH_2{-}CH_2{-}CH_2{-}SO_2{-}NH{-}C_3H_7$$

were briefly heated with 5 ml. of 38% formaldehyde in 10 ml. of water and evaporated to dryness in vacuo. The residue was taken up with dilute alkali.

The reaction product precipitated out and was recrystallised from absolute alcohol, 3 g. of desired product as a crystalline substance.

Example 7

(structure with $C_4H_9$ groups)

$C_{15}H_{32}N_4O_4S_2/396.44$; M.P.: 103–106° C.

*Analysis.*—Calculated: C, 45.43%; H, 8.14%; N, 14.13%. Found: C, 45.41%; H, 8.15%; N, 14.08%.

11 g. of the compound $$HClH_2N{-}CH_2{-}CH_2{-}SO_2{-}NH{-}C_4H_9$$

were dissolved in 50 ml. of water and neutralised with 5 g. of NaHCO₃. 15 ml. of 38% formaldehyde were added to the clear solution which was then allowed to stand for several hours. The precipitated reaction product was filtered with suction and recrystallised from absolute alcohol. 5 g. of desired product of M.P. 103–106° C. were obtained.

Example 8

(structure with two Cl-phenyl groups)

$C_{19}H_{22}O_4N_4S_2Cl_2/502.44$; M.P.: 195–196° C.

*Analysis.*—Calculated: C, 45.40%; H, 4.41%; N, 11.75%. Found: C, 45.65%; H, 4.58%; N, 11.61%.

2.34 g. of the compound $$Cl{-}\langle\phantom{x}\rangle{-}NH{-}SO_2{-}CH_2{-}CH_2{-}NH_2$$

were dissolved in 100 ml. of hot water, heated under reflux for 30 minutes together with 9 ml. of 40% formaldehyde and evaporated in vacuo to dryness.

The residue dissolved in CHCl₃, was dried over sodium sulphate and again evaporated. The residue was dissolved in 100 ml. of hot water and filtered with suction, recrystallised from alcohol; yield: 2 g. of desired product of M.P. 195–196° C.

Example 9

(structure with Cl-phenyl and butyl groups)

$C_{13}H_{19}N_2O_2SCl/302.819$; M.P.: 69–70° C.

*Analysis.*—Calculated: C, 51.56%; H, 6.32%; N, 9.25%. Found: C, 58.86%; H, 5.74%; N, 9.32%.

17 g. of the compound $$C_4H_9{-}NH{-}CH_2{-}CH_2{-}SO_2{-}NH{-}\langle\phantom{x}\rangle{-}Cl$$

were dissolved in 100 ml. of alcohol and heated under reflux for 30 minutes together with 15 ml. of 30% formaldehyde.

The mixture was evaporated to dryness, distributed between ether and water, the ether dried over Na₂SO₄ and evaporated. The residue was recrystallised from 2 alcohol. Yield: 12 g. of the desired product of M.P. 69–70° C.

Example 10

(structure with Cl-phenyl and propyl groups)

$C_{12}H_{17}O_2N_2SCl/288.813$; M.P.: 71–72° C.

*Analysis.*—Calculated: C, 49.90%; H, 5.93%; N, 9.70%. Found: C, 49.83%; H, 6.04%; N, 9.81%.

15 g. of the compound $$C_3H_7{-}NH{-}CH_2{-}CH_2{-}SO_2{-}NH{-}\langle\phantom{x}\rangle{-}Cl$$

were dissolved in 100 ml. of alcohol and, together with 13 ml. of 30% formaldehyde, heated under reflux for 45 minutes. The reaction solution was evaporated to dryness, distributed between ether and water and the ethereal phase dried over Na₂SO₄ and evaporated.

The residue was crystallised from alcohol and recrystallised from alcohol. Yielded 12 g. of the desired product of M.P. 71–72° C.

Example 11

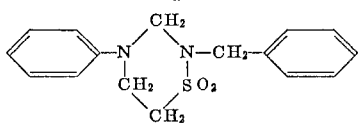

C₁₆H₁₈O₂N₂S/302.32; M.P.: 103–105° C.

*Analysis.*—Calculated: C, 63.56%; H, 6.00%; N, 9.27%. Found: C, 63.02%; H, 5.80%; N, 9.07%.

10.0 g. of the compound

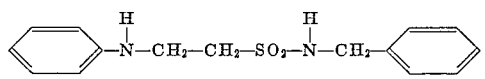

were dissolved in 100 ml. of 96% alcohol and boiled with 15 ml. of 40% formaldehyde for three hours under reflux. Water was added to complete cloudiness and then decanted; the precipitated oil was taken up with ether, dried and distilled off.

8.4 g. of a brown oil was dissolved in alcohol, cooled and filtered with suction. 4 g. of the desired product as white crystals of M.P. 98–103° C. were obtained which were recrystallised from alcohol for the analysis.

Example 12

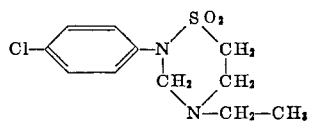

C₁₁H₁₅N₂O₂SCl/274.77; M.P.: 72–73° C.

*Analysis.*—Calculated: C, 48.09%; H, 5.50%; N, 10.20%. Found: C, 48.15%; H, 5.54%; N, 10.12%.

12 g. of the compound

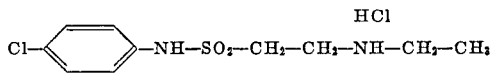

were dissolved in 100 ml. of alcohol and 1.6 g. of NaOH dissolved in about 5 ml. of water added. Then 10 ml. of 40% formaldehyde were added to the reaction solution which was heated for 1½ hours under reflux.

It was then evaporated to dryness in vacuo and taken up with CHCl₃/water. The chloroform was dried and distilled off and the oil crystallised slowly. The residue was triturated with petroleum ether, filtered with suction and recrystallised from alcohol/petroleum ether. 7 g. of the desired product as crystals of M.P. 72–73° C. were obtained.

Example 13

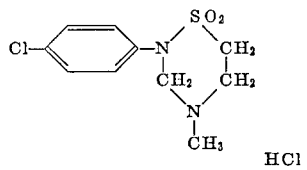

C₁₀H₁₃N₂O₂SCl/260.741; M.P.: 92–93° C.

*Analysis.*—Calculated: C, 46.06%; H, 5.02%; N, 10.75%. Found: C, 46.21%; H, 5.03%; N, 10.65%.

11.4 g. of the compound

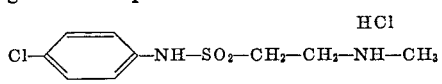

were dissolved in 100 ml. of alcohol and 1.6 g. of NaOH dissolved in about 5 ml. of water added. The precipitate was filtered with suction and 10 ml. of 40% formaldehyde added to the clear solution, which was heated for 1 hour under reflux and then evaporated to dryness. The oily residue was taken up with chloroform and water, the chloroform dried, filtered and distilled off. 8.5 g. of crystals of the desired product were obtained which were recrystallised from alcohol/petroleum ether.

Example 14

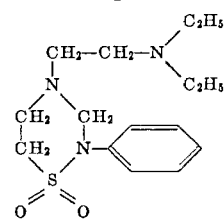

C₁₅H₂₅N₃O₂S/311.37; M.P.: 0.1.

*Analysis.*—Calculated: C, 57.86%; H, 8.09%; N, 13.50%. Found: C, 57.95%; H, 8.06%, N, 13.47%.

10 g. of

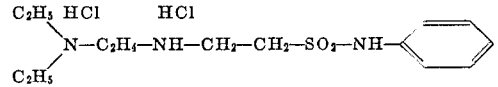

were dissolved in 25 ml. of warm water, first 4.5 g. of NaHCO₃ and then 25 ml. of alcohol added; the sodium chloride formed was filtered off. Then 2.2 g. (1.1 mol) of 40% formaldehyde were added and the reaction solution heated for half an hour under reflux and slightly concentrated in vacuo. The oil was taken up with ether, dried over Na₂SO₄ and the ether evaporated in vacuo. 5.6 g. of the desired product (a colourless clear oil) were obtained.

Example 15

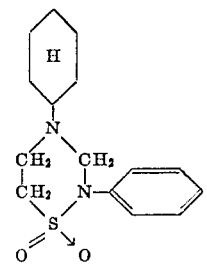

C₁₅H₂₂N₂O₂S/294.34; M.P.: 131–133° C.

*Analysis.*—Calculated: C, 61.20%; H, 7.53%; N, 9.52%. Found: C, 60.64%; H, 8.03; N, 9.54%.

14.0 g. of the compound

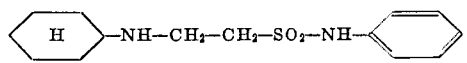

were dissolved in 50 ml. of alcohol and 15 ml. of 30% formaldehyde added. The solution was heated with stirring for one hour under reflux, 80 ml. of water then added and a white product obtained. The product was filtered with suction, washed with water and dried. 14 g. of the desired product as a white crystallised product of M.P. 131–133° C. were obtained.

Example 16

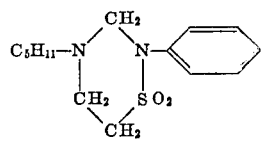

C₁₄H₂₂O₂N₂S/282.39; M.P.: 74–76° C.

*Analysis.*—Calculated: C, 59.55%; H, 7.85%; N, 9.92%. Found: C, 59.61%; H, 7.80%; N, 9.92%.

14.5 g. of N-n-amyl-β-amino-ethyl sulphonyl aniline in 100 ml. of alcohol were heated with 20 g. of 40% formaldehyde for two hours under reflux. The reaction solution was concentrated in vacuo, the residue taken up with ether, washed with water, dried and distilled off.

13.6 g. of oil were obtained to which hexane was added.

The resulting 9.0 of crystals were twice recrystallised from hexane. 6.2 g. of the desired product as white crystals of M.P. 70–72° C. were obtained.

Recrystallised from hexane for analysis.

Example 17

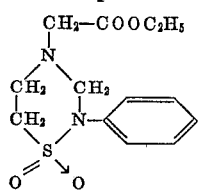

21.0 g. of the compound

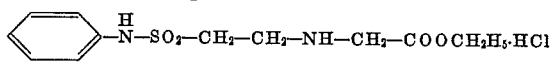

are dissolved completely in 100 ml. water and 100 ml. ethanol (96%) containing 9 g. NaHCO₃. 2.0 g. formaldehyde (40%) are added and the solution is allowed to stand for 2 days at room temperature. The precipitated large, white crystals are then filtered with suction to yield 8.1 g. of white crystals of M.P. 75–80° and crystallised for analysis from ether/petroleum ether to give 5.7 g. of white crystals of M.P. 77–79°.

*Analysis.*—Calculated: C, 52.39%; M, 6.09%; N, 9.42%. Found: C, 52.36%; M, 6.09%; N, 9.48%.

The taurinamide starting compound (M.P. 190–195° C.) is a new compound which may be prepared by the method of Goldberg (J.C.S. 1945, pp. 464–467).

Example 18

(a) 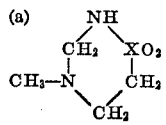 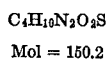

5 g. turinamide hydrochloride were dissolved in 50 ml. anhydrous formic acid, 6.1 g. formaldehyde (40%) were added and the mixture heated for 1 hour under reflux. The contents of the flask were then evaporated to dryness using a rotational evaporator to yield an oil which crystallised on addition of alcohol, giving 2.4 g. of white crystals. These were dissolved in a little water, neutralised with NaHCO₃ and the base extracted by shaking with methylene chloride, removal of solvent and drying in vacuo. The residue was recrystallised from alcohol. Yield: 0.7 g. white crystals, M.P. 138.5–139.3° C.

*Analysis.*—Calculated: C, 31.99%; H, 6.71%; N, 18.66%. Found: C, 32.16%; H, 6.85%; N, 18.59%.

(b) 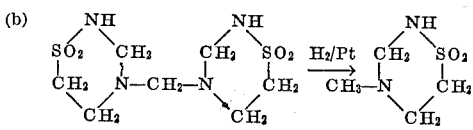

3 g. of the purified product of Example 4 were dissolved in 150 ml. acetic acid, a small quantity of PtO₂ catalyst was added and the mixture hydrogenated at normal pressure. The catalyst was removed by filtration and the filtrate evaporated to dryness. The residue was extracted once with ether, evaporated and the residue recrystallised from alcohol. Yield: 1.2 g., M.P. 137.5–139° C. Mixed melting point with the compound of (a) above showed no depression. The IR-spectra, taken in methylene chloride, showed no differences in absorption between 3 and 15μ.

Example 19

Spray composition: Percent
    Product of Example 4 (5μ grain size) _____ 2
    Mixture of fatty acid esters, for example isopropylmyristate, purcelline oil etc. _____ 5
    Perfume oil _____ 0.5
    Rest add 100 g. monofluoro-dichloromethane and difluorodichloromethane (50/50) or difluorodichloromethane alone.

The composition is filled into aerosol spray containers under pressure.

Example 20

Ointment: Grams
    Product of Example 4 _____ 100
    Wool fat _____ 90
    White soft paraffin _____ 900

The fat and paraffin are melted, mixed together and cooled. The active compound is then blended in.

Example 21

Tablets:
    Product of Example 4 _____grams__ 50
    Lactose _____do____ 77.5
    Maize starch _____do____ 22.5
    10% w./c. maize starch paste, q.s.
    Magnesium stearate (w./w.) _____percent__ 1.0

The powders are blended and damped with starch paste followed by granulation. After drying the granules are blended with magnesium stearate and compressed into tablets each containing 50 mg. active compound.

Example 22

Powder: Grams
    Product of Example 4 _____ 10
    Starch _____ 10
    Purified talc, up to 100 grams.

I claim:

1. A perhydro-1,2,4-thiadiazinedioxide-(1,1) of the formula

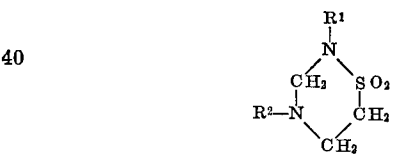

where R¹ and R², which may be the same or different, are hydrogen atoms, alkyl groups having 1–8 carbon atoms, cyclohexyl, monocarbocyclic aralkyl groups having 1–8 carbon atoms in the alkyl portion, phenyl or a 1,1-dioxido-perhydro-1,2,4-thiadiazinylmethyl group or together with the perhydrothiadiazinedioxide ring to which they are attached form a ring of perhydrothiadiazinedioxide nuclei separated by methylene groups joining nitrogen atoms of adjacent nuclei and their physiologically acceptable acid addition salts.

2. A compound as claimed in claim 1 having the formula

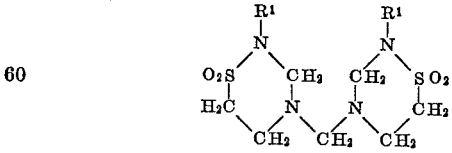

where R¹ has the meaning given in claim 1 and and its physiologically acceptable acid addition salts.

3. A compound as claimed in claim 1 in which one or both of R¹ and R² carry halogen atoms or hydroxy, amino, carboxylic acylamido, carboxy, carbalkoxy having 1–8 carbon atoms in the alkyl portion, alkoxy having 1–8 carbon atoms in the alkyl portion, methyl or nitro groups as substituents.

4. A compound as claimed in claim 1 in which one or both of R¹ and R² is a methyl, ethyl, chloroethyl, hydroxyethyl, aminoethyl, carboxymethyl, propyl, isopropyl, butyl, isobutyl, 1-methylpropyl, tertiary butyl, hexyl, cyclohexyl, methylcyclohexyl or benzyl group.

5. A compound as claimed in claim 2 in which $R^1$ is hydrogen and its physiologically acceptable acid addition salts.

6. A compound as claimed in claim 1 in which the acid addition salts are the hydrohalides sulphates, phosphates, nitrates, acetates, citrates, tartrates, maleates or succinates.

7. A process for the production of a compound as claimed in claim 1 in which a taurineamide of the formula $$R^2-NH-CH_2-CH_2-SO_2-NH-R^1$$

is reacted with formaldehyde or a substance liberating formaldehyde.

8. A process as claimed in claim 7 in which the reaction is effected in an inert solvent medium.

9. A process as claimed in claim 8 in which the solvent is water, a substituted amide solvent, a cyclic or acyclic ether solvent, a hydrocarbon or nitro-hydrocarbon solvent, an alkanol solvent or a halogenated hydrocarbon solvent.

10. A process as claimed in claim 7 in which the formaldehyde liberating substance is paraformaldehyde.

11. A process as claimed in claim 7 in which the reaction temperature is 20–120° C.

12. A process as claimed in claim 7 in which the reaction medium is weakly alkaline.

13. A process as claimed in claim 7 in which the ratio of formaldehyde to taurinamide is at least 1:1.

14. A process as claimed in claim 7 in which a compound as defined in claim 2 is produced and is converted into the compound of claim 1 in which $R^1$ and $R^2$ are hydrogen by catalytic hydrogenation.

15. A process as claimed in claim 14 in which hydrogenation is effected using platinum oxide as catalyst.

16. A process as claimed in claim 7 in which the taurinamide starting material is prepared by reacting ammonia or a primary amine $R^2NH_2$ with a vinyl sulphonamide of the formula $CH_2=CH-SO_2-NH-R^1$, $R^1$ and $R^2$ having the meanings given in claim 1.

17. A process as claimed in claim 7 in which the taurinamide starting material is prepared by reacting the phthalimido derivative of an acid halide of taurine with a primary amine followed by removal of the phthalyl group.

References Cited

UNITED STATES PATENTS

| | | | |
|---|---|---|---|
| 2,466,396 | 4/1949 | Dickey | 260—243 |
| 3,103,511 | 9/1963 | Bernstein et al. | 260—243 |
| 3,108,124 | 10/1963 | Close | 260—243 |

HENRY R. JILES, *Pirmary Examiner.*

JOHN M. FORD, *Assistant Examiner.*

U.S. Cl. X.R.

167—33; 260—556, 326, 501.12, 501.15